(12) United States Patent
Kolze et al.

(10) Patent No.: US 6,904,111 B1
(45) Date of Patent: Jun. 7, 2005

(54) ASYNCHRONOUS RESAMPLING FOR DATA TRANSPORT

(75) Inventors: Thomas J. Kolze, Phoenix, AZ (US); Holly C. Osborne, Redondo Beach, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/516,800

(22) Filed: Mar. 1, 2000

(51) Int. Cl.[7] .............................................. H04L 7/00
(52) U.S. Cl. ........................ 375/354; 375/356; 375/358; 375/376
(58) Field of Search .................. 375/354–359, 375/219, 376, 367, 369, 372, 373, 371; 370/276, 278, 282, 503, 507, 509, 517, 516

(56) References Cited

U.S. PATENT DOCUMENTS

| | | | | | |
|---|---|---|---|---|---|
| 5,519,737 A | * | 5/1996 | Brun et al. | ................. | 375/376 |
| 5,550,860 A | * | 8/1996 | Georgiou et al. | ........... | 375/220 |
| 5,563,891 A | * | 10/1996 | Wang | .......................... | 370/505 |
| 5,680,422 A | * | 10/1997 | Burch et al. | ................. | 375/371 |
| 5,694,174 A | * | 12/1997 | Suzuki | ........................ | 348/518 |
| 5,805,650 A | * | 9/1998 | Belot et al. | .................. | 375/376 |
| 5,822,317 A | * | 10/1998 | Shibata | .................. | 370/395.62 |
| 5,950,115 A | * | 9/1999 | Momtaz et al. | ............... | 455/73 |
| 6,031,886 A | * | 2/2000 | Nah et al. | .................... | 375/375 |
| 6,055,247 A | * | 4/2000 | Kubota et al. | ............... | 370/508 |
| 6,154,466 A | * | 11/2000 | Iwasaki et al. | ............. | 370/466 |
| 6,285,726 B1 | * | 9/2001 | Gaudet | ........................ | 375/376 |
| 6,301,297 B1 | * | 10/2001 | Russo | ........................ | 375/222 |
| 6,327,273 B1 | * | 12/2001 | Van der Putten et al. | ... | 370/503 |
| 6,397,042 B1 | * | 5/2002 | Prentice et al. | .......... | 455/67.14 |
| 6,470,033 B1 | * | 10/2002 | Menzi et al. | ............... | 370/505 |
| 6,493,408 B1 | * | 12/2002 | Kobayashi | .................. | 375/357 |
| 6,657,953 B1 | * | 12/2003 | Hiramoto et al. | ........... | 370/224 |

OTHER PUBLICATIONS

G. Ungerboeck, "Trellis–Coded Modulation with Redundant Signal Sets, Part I: Introduction," IEEE Communications Magazine; vol. 25, No. 2, pp. 5–11, Feb. 1987.

G. Ungerboeck, "Trellis–Coded Modulation with Redundant Signal Sets, Part II: State of the Art," IEEE Communications Magazine; vol. 25, No. 2, pp. 12–21, Feb. 1987.

Claude Berrou and Alain Glavieux, "Near Optimum Error Correcting Coding and Decoding: Turbo–Codes," IEEE Transactions on Communications, vol. 44, No. 10, pp. 1261–1271, Oct. 1996.

\* cited by examiner

*Primary Examiner*—Emmanuel Bayard

(57) ABSTRACT

A data and clock signals from a source (12) are transmitted from a location (10) to a distant location (40) together with a phase signal which estimates the difference in phase between a data clock signal and a reference clock signal generated by a reference clock (24) at location (10). At the second location (40), the phase signal is used to address coefficients stored in a read only memory (56) which are used to condition a resample or interpolate filter (50) which generates resampled data signals.

30 Claims, 3 Drawing Sheets

ASYNCHRONOUS RESAMPLING FOR DATA TRANSPORT

BACKGROUND OF THE INVENTION

This invention relates to the transport of a multiplex of sampled signals from one location to another, and more particularly relates to such transport accomplished asynchronously.

For the transport of a multiplex of sampled signals from one location to another, there sometimes is a premium placed on maintaining fidelity for some of the sampled signals. Conventional processing of such sampled signals typically requires the original sampling clock (or a synchronously related version) in order to convert the digital data streams back into analog form. The conventional systems thus retain crucial sample time "information" contained in the sampling clock. The signal transport is sometimes complicated by the large amount of data per signal and large number of signals which must be multiplexed. As a result, efficiency is important in order to minimize the number of additional signals and/or clocks transported.

Experience has shown that distributing the original sampling clock signals available at a first location to a distant second location (the endpoint of the data transport) is prohibitively complex. In addition, there may be many such signals and clocks which require transport. Digital resampling of each data stream in the multiplex at the first location (onto a "suitable" clock signal, assuming a "suitable" clock signal is available) is unattractive because it results in a significant increase in word length prior to transport. Such a method is inefficient in that the amount of transported data is increased up to 50% by the resampling, if fidelity is strictly maintained. Time stamps can be imposed at the first location, but analysis shows that these are unable to provide the equivalent fidelity reconstruction available with the original sampling clock or with a resampling prior to transport, even with a significant change or improvement in the time-stamp implementation.

The present invention addresses the foregoing problems raised by conventional transport and provides alternative solutions.

BRIEF SUMMARY OF THE INVENTION

The invention is useful in a communication system for transporting a plurality of sampled signals from a first location to a second location. In such an environment, one or more data signals and a set of one or more synchronously-related clock signals exist at a first location. One or more reference signals are generated at the first location, preferably by a reference clock. At the first location, a phase signal is generated which represents at least an estimate of the difference in phase between one of the data clock signals and one of the reference signals. The one or more data signals and phase signal are transported to a second location. At the second location, resample filters are conditioned in response to the phase signal, preferably by a filter selector. Each conditioned resample filter is responsive to the one or more data signals in order to generate one or more resampled data signals at the second location.

Digital signal processing or analog conversion may be accomplished on these one or more resampled data signals at the second location, using the second location's reference clocks, with fidelity approaching processing with the synchronous sample clocks at the first location.

By using the foregoing techniques, data may be transported between locations with a degree of economy, convenience and accuracy unavailable by using the known transport techniques. For example, the addition of the phase signal to the transport increases the transport data by less than 0.2%, while maintaining necessary fidelity provided by synchronous processing at the first location, in one application.

DETAILED DESCRIPTION OF THE PREFERRED EMBODIMENTS

Figure 1:
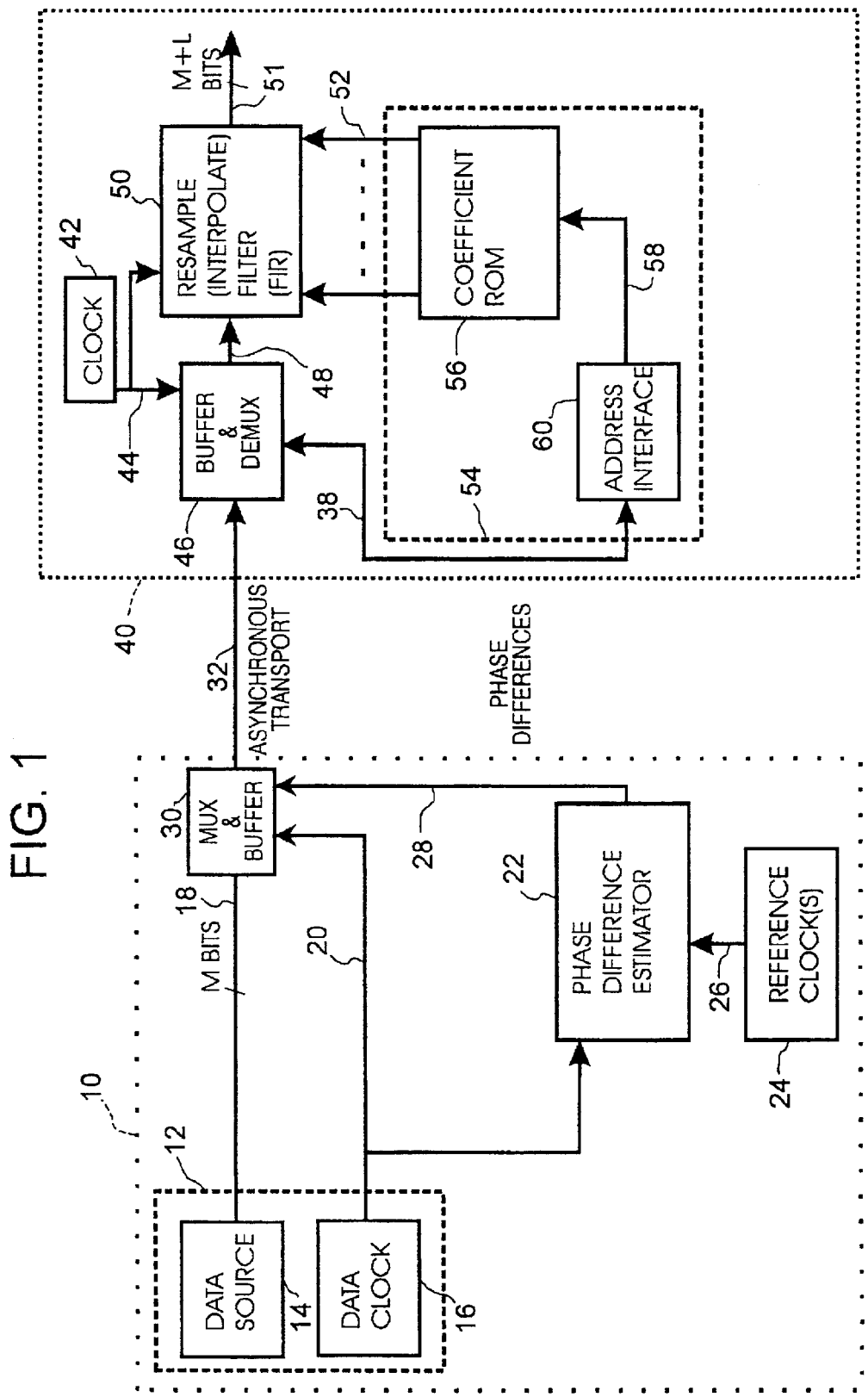
FIG. 1 is a schematic block diagram of a preferred form of the present invention as operated on a single sampled signal.

Referring to FIG. 1, a preferred form of the present invention is used to transport a single data signal from a first location 10 to a second location 40. Within location 10, there is a source 12 of one data signal and one clock signal. More specifically, source 12 comprises a data signal source 14 and a clock signal source 16. The data signal is transmitted over an M bit bus 18, and the clock signal is transmitted over a bus 20 which also provides an input to a phase difference estimator 22. Inputs are also received by estimator 22 over a bus 26 from one or more reference clocks 24 which generate reference signals. Phase difference estimator 22 generates a phase signal on an output bus 28 representing at least an estimate of the difference in phase between the data clock signal on bus 20 and the reference clock signal on bus 26. Mux and Buffer 30 multiplexes the phase differences 28 with the data signal 18 and buffers and formats for asynchronous transport. Bus 32 comprises a long distance communication line which transports the multiplexed data signal and phase signal to location 40.

At location 40, a clock 42 transmits clock pulses over a bus 44 to a Buffer and Demux 46 and a resample filter 50 which interpolates the data received over a bus 48 from buffer 46. Clock 42 may be asynchronous with respect to other clocks shown in the system, such as data clock 16. The data is clocked out of buffer 46 by the clock signals on bus 44. Filter 50 comprises a finite impulse response (FIR) filter which interpolates based on coefficients received over an input bus 52 from a filter selector 54. Selector 54 includes a coefficient read only memory (ROM) 56 addressed by signals received over an address bus 58 from an address interface 60 which conditions the phase signal received on bus 28 in order to address ROM 56. Buffer and Demux 46 strips off the phase estimates and provides these to the Address Interface 60 over Bus 38.

In response to the coefficients read out of ROM 56, filter 50 generates resample data signals that are transmitted over an output bus 51. Since the resampling process generates data in addition to the original M bits of data received on bus 48, the output bus 51 provides for M plus L bits of data.

Estimator 22 may comprise the phase estimate portion of part number G802480 manufactured by TRW, Inc.

Figure 2:
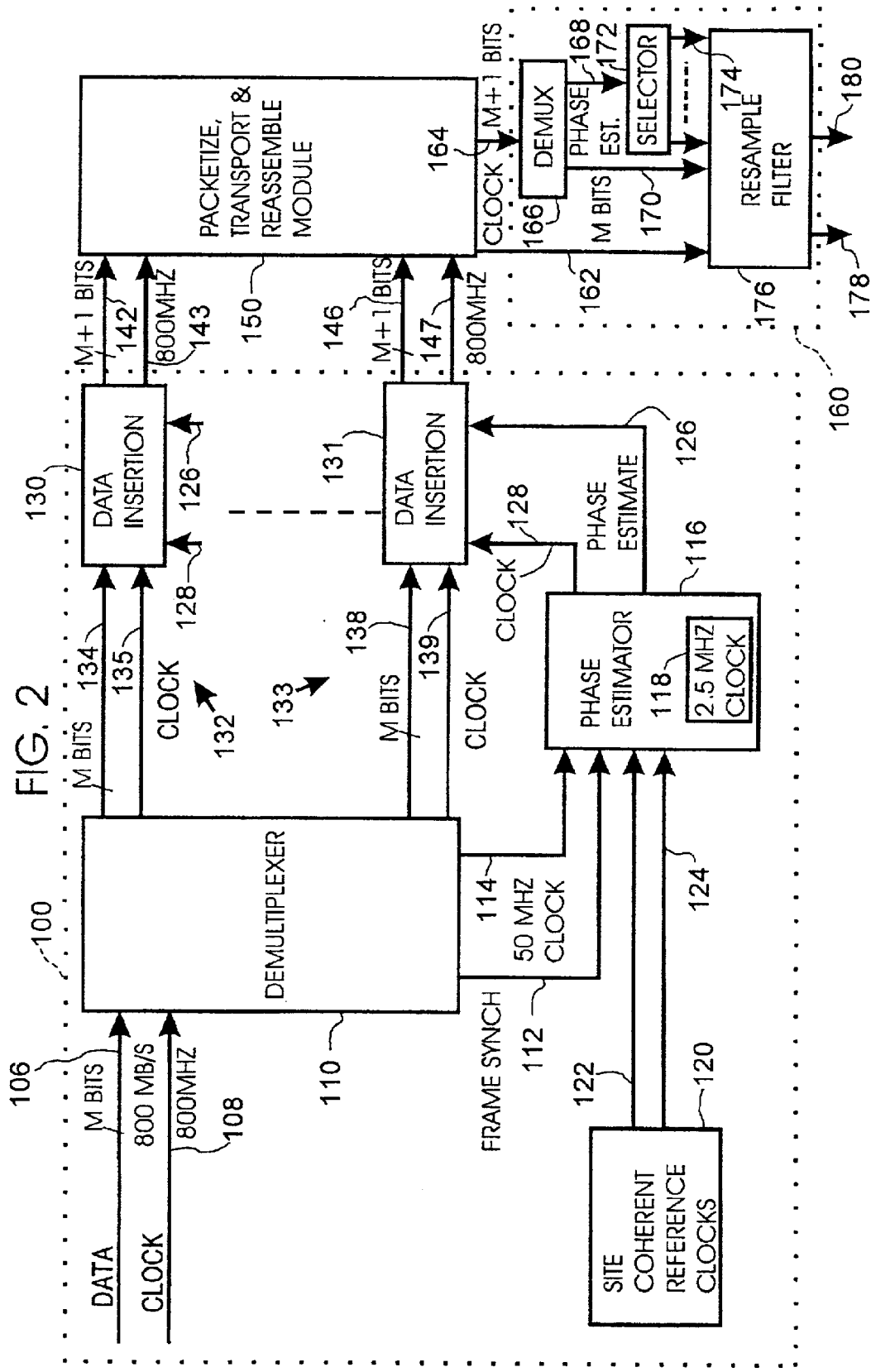
FIG. 2 is a schematic block diagram of one alternative of the present invention applied to a multiplicity of sampled signals.

Referring to FIG. 2, location 100 is provided with multiple channels of multiplexed synchronously sampled data signals on a bus 106 and is provided with a high rate clock signal on a bus 108. Data is transmitted on bus 106 at a rate of 800 megabytes per second (in one embodiment), and the clock signal on bus 108 has a frequency of 800 MHz. Busses 106 and 108 provide inputs to a conventional demultiplexer 110 which separates the data and clock into individual channels, such as channels 132 and 133.

Channel 132 comprises a pair of busses 134 and 135. Bus 134 transmits M bits of data and bus 135 transmits a subharmonic of the 800 MHz clock signal. Channel 133 comprises an M bit data bus 138 and a clock bus 139 which transmits a subharmonic of the 800 MHz clock signal.

Demultiplexer 110 also extracts the frame synch signal transmitted on bus 106 from the data signals and supplies the frame synch-signal on a bus 112. Demultiplexer 110 also divides the 800 MHz clock signal to form a 50 MHz clock signal on an output conductor 114.

The frame synch signal and the 50 MHz clock signal provide inputs to a phase estimator 116 which also divides the 50 MHz clock in order to form a 2.5 MHz clock 118. Additional inputs to phase estimator 116 are provided by coherent reference clocks 120 which provide coherent (i.e., phase aligned) clock signals over buses 122 and 124. Phase estimator 116 generates a phase signal on an output conductor 126 which represents at least an estimate of the phase difference between the reference clock signals and (a) the 50 MHz clock signal and (b) the 2.5 MHz clock signal. The 2.5 MHz clock signal from clock 118 provides ambiguity resolution information for the phase difference calculation. That is, the phase signal generated on bus 126 provides a phase difference between the phase of the reference clock signals and the 2.5 MHz clock signal, but with fidelity to the least significant bits relative to the 50 MHz clock signal. By using the 2.5 MHz and the 50 MHz clock signals, the embodiment of FIG. 2 can achieve a least significant bit fidelity to the phase of the 800 MHz clock signal (which is divided to form the 50 MHz clock signal).

Alternatively, rather than using the 2.5 MHz clock to resolve ambiguity, the phase estimator 116 may use the frame synch signal. In general, ambiguity resolution may be achieved by the lowest clock rate for which resampling is to occur, that is, the lowest data clock for which the resampling function is required. However, the lowest clock rate used for ambiguity resolution must be synchronous with the 800 MHz clock. Synchronization can be accomplished by dividing the 800 MHz clock by conventional dividers (not shown).

Still referring to FIG. 2, a phase estimator clock signal is transmitted over a bus 128 to each of several data insertion modules, such as 130 and 131. There is one data insertion module for each of the channels of data, such as channels 132 and 133. The phase estimate signal on bus 126 also is transmitted to each of the data insertion modules. The data insertion modules insert the phase signals on buses 126 as an extra bit in the data words transmitted on the channels. As a result, output data buses 142 and 146 transmit M plus 1 bits of data. Output busses 143 and 147 continue to carry subharmonics of the 800 MHz clock signal which was passed through from busses 135 and 139.

The data and clock signals from busses 142, 143, 146 and 147 provide inputs to a packetized transport and reassemble module 150. Module 150 includes communication channels which transmit data and clock signals between location 100 and a location 160 which may be many miles from location 100.

At location 160, only one channel of data and clock signals is shown. The other channels may be processed in a manner similar to the one channel illustrated in FIG. 2. The illustrated channel comprises a clock bus 162 which transmits the 800 MHz clock and a data bus 164 which transmits the M plus 1 bits received on channel 142. Bus 164 provides an input to a demultiplexer circuit 166 which separates the data into a data bus 170 of M bits and a phase estimate bus 168 which transmits the phase estimate signal to a selector 172 that may be identical to selector 54 shown in FIG. 1. Coefficients are selected and provided to a resample or interpolate filter 176 over a bus 174. In the same manner described in connection with FIG. 1, resample filter 176 provides resampled data signals over an output bus 180 and 800 MHz clock signals over an output bus 178.

In FIG. 2, the phase estimates were multiplexed into each data signal stream by adding an extra bit to each sample. This may have advantages, in particular regarding legacy equipment. However, this does mean redundant information is included in the transport from location 100 to location 160 (since identical phase inserts are inserted multiple times). A more efficient approach is shown in FIG. 3, with each phase estimate only inserted one time into the transport.

Figure 3:
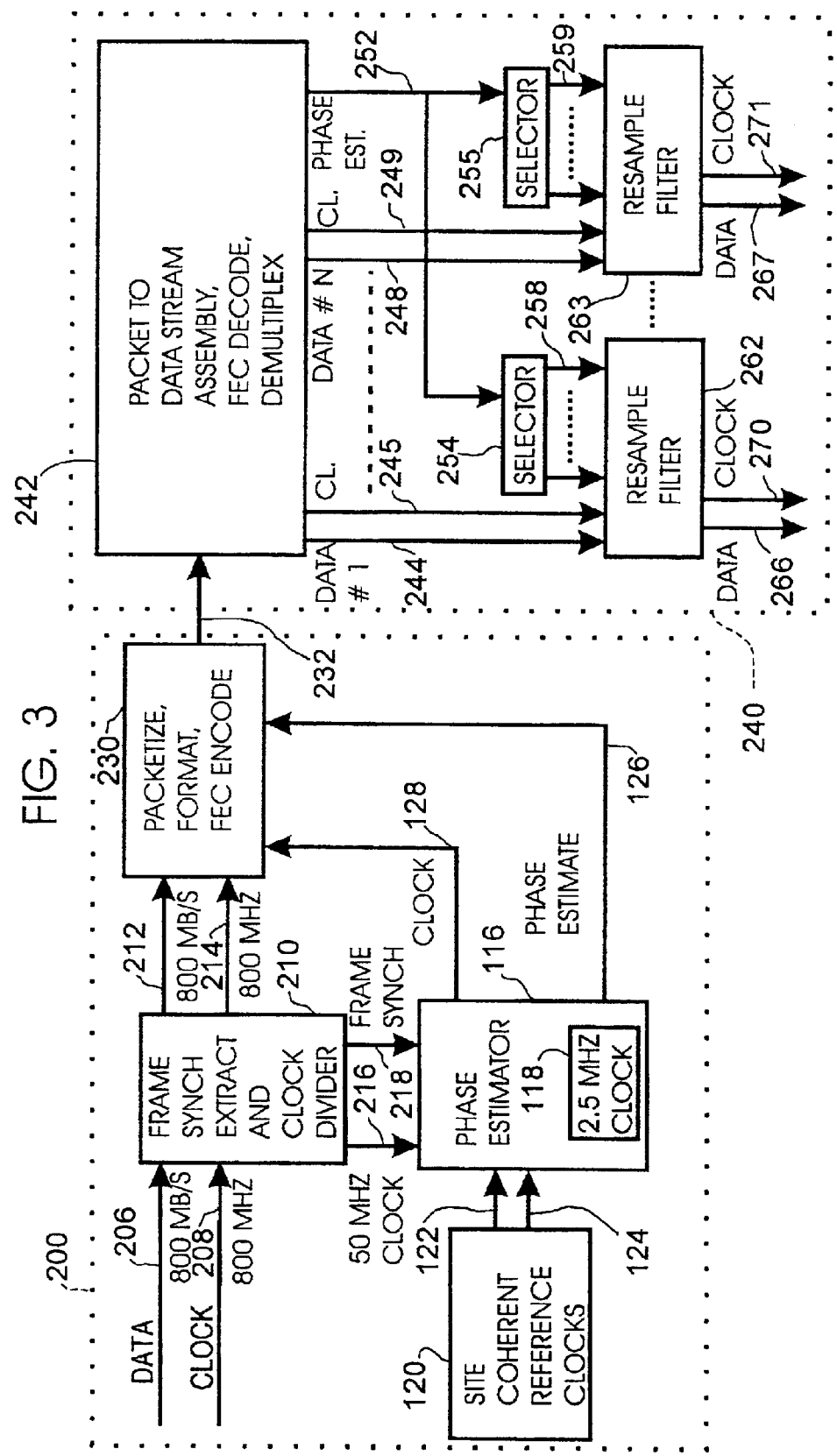
FIG. 3 is a schematic block diagram of a second, preferred, implementation of the present invention applied to a multiplicity of sampled signals.

Referring to FIG. 3, location 200 is provided with a multiplex of synchronously sampled data signals on a bus 206 and is provided with a high rate clock signal on a bus 208. Bus 206 transmits multiple channels of data signals at 800 megabytes per second (in one embodiment) and also transmits multiple channels of clock signals at 800 MHz over a bus 208. Buses 206 and 208 provide an input to a frame synch extract and clock divider module 210 which passes the multiple channels of data signals at 800 megabytes per second over buses 212 and passes the 800 megahertz clock signals over buses 214. Module 210 also extracts the frame synch signal from the data signals and transmits it over an output bus 218. Module 210 also divides the 800 MHz clock signal to generate a 50 MHz clock signal over a bus 216.

A phase estimator 116 receives the frame synch signal and 50 MHz clock signal, and also receives coherent (e.g., phase aligned) reference clock signals from clocks 120 over input busses 122 and 124. Estimator 116 includes a 2.5 MHz clock 118. Phase estimator 116 operates in the same manner described in connection with estimator 116 shown in FIG. 2 and provides a phase estimate signal over bus 126 on a clock signal over bus 128 in the manner previously described. In general, the components of FIG. 3 which bear the same numbers as components shown in FIG. 2 are constructed the same and operate in the same manner described in connection with FIG. 2.

As shown in FIG. 3, only a single phase estimate signal on bus 126 is provided for the multiple channels of data on buses 212 and the multiple channels of clocks on busses 214.

The data and clocks on buses 212 and 214 are assembled into data packets by a packatize format and forward error correction (FEC) encode module 230. Similarly, the phase estimate signal on bus 126 and the clock on bus 128 are also assembled into data packets by module 230. All of the packets are transmitted over a communication line 232 to location 240 which may be at a distance of many miles from location 200.

At location 240, a packet to data stream assembly, FEC decode and demultiplex module 242 divides the data and clocks into multiple channels, including data channels 1–N and corresponding clock channels as shown. Only two pairs of the data and clock channels are illustrated in FIG. 3. For example, in channel 1, data signals are transmitted over a data bus 244 and clock signals are transmitted over a clock bus 245. Similarly, in channel N, data signals are transmitted over a bus 248 and corresponding clock signals are transmitted over a bus 249.

The phase estimate signal is recovered by module 242 and is transmitted over a bus 252 to selectors, such as selectors 254 and 255. There is one selector for each channel (i.e., N selectors). The selectors transmit coefficients over buses 258 and 259 to resample filters 262 and 263 as shown. There is one resample filter for each channel. As a result, there are N resample filters in total, only two of which are illustrated in FIG. 3. Resample or interpolate filters 262 and 263 operate in the same manner as resample or interpolate filter 50 shown in FIG. 1. As a result, resampled data signals are transmitted over buses 266 and 267, and corresponding clock signals are transmitted over buses 270 and 271.

The phase estimate signals on bus 126 must be put in packets by module 230 frequently enough to provide adequate phase estimates for selectors 254 and 255 and resample filters 262 and 263. Even at low data stream sample rates, there are, for example, greater than 50 samples of data for each phase estimate. At this point, the phase estimates are not time critical. Phase estimates may be added to the data samples with only one bit.

Referring to FIG. 3, owing to the resample filters, the phase estimates on bus 252 need not be generated frequently, and there is no urgency in aligning these estimates precisely with the data bits in the high rate serial stream, such as bus 244. The phase difference information on bus 252 is not time critical (relative to the high rate serial clock on bus 245). Thus, the phase estimate need not be handled and delivered with nanosecond timing alignment to the serial data on bus 244.

Still referring to FIG. 3, the phase estimate on bus 126 may be performed on a divided down clock from the 800 MHz clock signal on bus 208. The estimated phase signal on bus 126 is inserted into the high rate multiplexed data stream one signal or one packet at a time for use by the multiplex data streams at location 240. This represents the minimal processing at location 200, and the minimal amount of overhead data added to the transport, and it retains the fidelity of the clocks in locations 200 and 240. As pointed out previously, two resampler phase estimates may be needed for ambiguity resolution, one for the highest resampling clock (e.g., 50 MHz) and one for the lowest (e.g., 2.5 MHz). These two phase estimates (modulo 360°) may be combined into a single phase estimate which extends beyond 360° (i.e., resolved ambiguity). Alternatively, the frame synch signal on bus 218 may be used for ambiguity resolution.

Those skilled in the art will recognize that the preferred embodiments may be altered and modified without departing from the true spirit and scope of the invention as defined in the accompanying claims. For example, selector 54 may compute the coefficients used by filter 50.

What is claimed is:

1. In a communication system, apparatus for transporting a plurality of sampled signals asynchronously from a first location to a second location comprising in combination:
   a source of one or more data signals and one or more clock signals at said first location;
   a plurality of reference clocks generating a plurality of reference signals at said first location;
   a phase difference estimator generating a phase signal representing at least an estimate of the difference in phase between one of said clock signals and a plurality of said reference signals;
   a communication channel transmitting said one or more data signals and said phase signal asynchronously to said second location;
   a resample filter located at said second location;
   a selector responsive to said phase signal for conditioning the resample filter in response to said phase signal, said conditioned resample filter being responsive to said one or more data signals for generating one or more resampled data signals at the second location;
   wherein the resampled data signals are accurately represent the original data signals without significantly burdening the communication channel with synchronization data.

2. Apparatus, as claimed in claim 1, wherein said selector comprises a memory storing coefficients for said resample filter.

3. Apparatus, as claimed in claim 2, wherein the memory is addressed in response to said phase signal.

4. Apparatus, as claimed in claim 1, wherein said selector computes coefficients for said resample filter.

5. Apparatus, as claimed in claim 1, and further comprising a buffer at the second location for storing said one or more data signals.

6. Apparatus, as claimed in claim 5, and further comprising a second source of one or more clock signals located at the second location for clocking said one or more data signals from said buffer to said resample filter, said second source being unsynchronized with said first source.

7. Apparatus, as claimed in claim 1, wherein said data signals comprise
   a plurality of channels of multiplexed data signals and wherein said source comprises a demultiplexer arranged to separate said plurality of channels into individual channels and to generate one or more divided clock signals divided down from said clock signals.

8. Apparatus, as claimed in claim 7, wherein said demultiplexer extracts a frame synch signal derived from said multiplexed data signals, wherein said one or more reference signals comprise one or more coherent reference signals and wherein said phase difference estimator generates said phase signal in response to said frame synch signal, at least one of said divided clock signals and at least one of said one or more coherent reference signals.

9. Apparatus, as claimed in claim 7, wherein said one or more divided clock signals comprises a first divided clock signal having a first frequency and a second divided clock signal having a second frequency less than said first frequency and wherein said phase difference estimator generates said phase signal in response to said first and second divided clock signals and at least one of said one or more coherent reference signals.

10. Apparatus, as claimed in claim 7, and further comprising a data insertion module arranged to insert said phase signal into said plurality of channels.

11. Apparatus, as claimed in claim 1, wherein said one or more data signals further comprise frame synch signals and wherein said one or more reference signals comprise one or more coherent reference signals.

12. Apparatus, as claimed in claim 11, wherein said phase difference estimator generates said phase signal in response to at least one of said frame synch signals and at least one of said one or more coherent reference signals.

13. Apparatus, as claimed in claim 12, wherein said one or more clock signals comprise a first clock signal having a first frequency and a second clock signal having a second frequency less than said first frequency and wherein said phase difference estimator generates said phase signal in response to said first and second clock signals and at least one of said one or more coherent reference signals.

14. Apparatus, as claimed in claim 11, and further comprising a packetizing module arranged to transmit said data signals, said clock signals and said phase signal in packets.

15. Apparatus, as claimed in claim 14, wherein said one or more data signals comprises a plurality of channels of multiplexed synchronously sampled data signals and wherein said phase signal comprises a separate phase signal for each said channel.

16. In a communication system, a method for asynchronously transporting a plurality of sampled signals from a first location to a second location comprising in combination:

processing one or more data signals and one or more clock signals at said first location;

generating a plurality of reference signals at said first location;

generating at said first location a phase signal representing at least an estimate of the difference in phase between one of said clock signals and said plurality of reference signals;

transmitting said one or more data signals and said phase signal to said second location over an asynchronous communication channel;

resample filtering said one or more data signals at said second location;

conditioning the resample filtering in response to said phase signal, said conditioned resample filtering being responsive to said one or more data signals for generating one or more resampled data signals at the second location;

wherein the resampled data signals accurately represent the original data signals without significantly burdening the communication channel with synchronization data.

17. A method, as claimed in claim 16, wherein said conditioning comprises storing coefficients for said resample filtering.

18. A method, as claimed in claim 17, wherein said conditioning further comprises addressing said coefficients in response to said phase signal.

19. A method as claimed in claim 16, wherein said conditioning comprises computing coefficients for said resample filtering.

20. A method, as claimed in claim 16, wherein said transmitting comprises storing said one or more data signals at the second location.

21. A method, as claimed in claim 20, and further comprising clocking said data signals at said second location after said storing, said clocking being unsynchronized with said data clock signals at said first location.

22. A method, as claimed in claim 16, wherein said processing comprises:

processing a plurality of channels of multiplexed data signals;

dividing at least one of said clock signals into one or more divided clock signals; and demultiplexing said plurality of channels into individual channels.

23. A method, as claimed in claim 22, and further comprising deriving a frame synch signal from said multiplexed data signals, wherein said generating one or more reference signals comprises generating one or more coherent reference signals and wherein said generating at said first location a phase signal comprises generating said phase signal in response to said frame synch signal, at least one of said divided clock signals and at least one of said one or more coherent reference signals.

24. A method, as claimed in claim 22, wherein said dividing comprises dividing said clock signals into a first divided clock signal having a first frequency and a second divided clock signal having a second frequency less than said first frequency and wherein said generating at said first location a phase signal comprises generating said phase signal in response to said first and second divided clock signals and at least one of said one or more coherent reference signals.

25. A method, as claimed in claim 22, and further comprising inserting said phase signal into said plurality of channels.

26. A method, as claimed in claim 16, wherein said processing comprises deriving a frame synch signal from said data signals, generating one or more divided clock signals derived from said clock signals and wherein said generating one or more reference signals comprises generating one or more coherent reference signals.

27. A method, as claimed in claim 26, wherein said generating at said first location a phase signal comprises generating said phase signal in response to said frame synch signal and at least one of said one or more coherent reference signals.

28. A method, as claimed in claim 26, wherein said generating one or more divided clock signals comprises generating a first divided clock signal having a first frequency and a second divided clock signal having a second frequency less than said first frequency and wherein said generating at said first location a phase signal comprises generating said phase signal in response to said first and second divided clock signals and at least one of said one or more coherent reference signals.

29. A method, as claimed in claim 26, and further comprising transmitting said data signal, said clock signals and said phase signal in packets to said second location.

30. A method, as claimed in claim 29, wherein said processing one or more data signals comprises processing a plurality of channels of multiplexed synchronously sampled data signals and wherein said generating at said first location a phase signal comprises generating a separate phase signal for each of said plurality of channels.

* * * * *